Nov. 4, 1952  C. N. LEGGE ET AL  2,616,450
PILOT CONTROLLED VALVE WITH PRESSURE SURGE RELIEF
Filed March 26, 1948  4 Sheets-Sheet 1

Charles N. Legge Inventors
William O. Manning
By
Attorney

Nov. 4, 1952 — C. N. LEGGE ET AL — 2,616,450
PILOT CONTROLLED VALVE WITH PRESSURE SURGE RELIEF
Filed March 26, 1948 — 4 Sheets-Sheet 4

Charles N. Legge
William O. Manning
Inventors
By
Attorney

Patented Nov. 4, 1952

2,616,450

UNITED STATES PATENT OFFICE 2,616,450

PILOT CONTROLLED VALVE WITH PRESSURE SURGE RELIEF

Charles Norton Legge, West Malvern, and William Oke Manning, East Meon, England, assignors to Flight Refuelling Limited, London, England, a British company Application March 26, 1948, Serial No. 17,186
In Great Britain April 2, 1947

3 Claims. (Cl. 137—670)

This invention relates to improvements in or relating to valves for controlling the flow of fluids.

More particularly, the invention relates to valves of the pressure differential operated type for automatically stopping the flow of fluid into a tank or the like reservoir when a desired fluid level has been attained in said tank, or for the remote control of said fluid flow, or for other applications where the flow of the fluid through the valve is used to operate said valve. The invention is particularly useful for filling valves for use in connection with fuel tanks, for example in aircraft, where the fuel is admitted under pressure.

Filling the large capacity fuel tanks of modern military and civil aircraft takes a considerable time under conventional methods so that filling under pressure becomes a very important time saving factor. An inherent disadvantage of such high-speed pressure filling lies in the fact that very careful check has to be kept on the fuel level in the tank to prevent overloading and possibility of bursting the tank with its attendant dangers. This is accentuated when filling more than one tank at one time.

Moreover, when passing fluids at high flow speeds an immediately complete shut-off is liable to cause high surge or "flick" pressure loads with consequent "hammering" in the pipe lines and the like of the fluid system.

An object of the present invention is to provide a valve operating on the pressure differential principle, which permits a substantially high rate of fluid flow with safety and in which surge or "flick" pressure loads occurring immediately after complete or substantially complete shut-off are relieved.

To this end, the valve of the present invention comprises a casing, having an inlet and an outlet, housing a piston arranged to slide therein and provided with a passage connecting two opposed piston faces, of unequal surface areas through which passage a part of the fluid may pass into a cavity formed between the larger of the opposed piston faces and a part of the casing wall, said cavity having a closable orifice in the casing wall, wherein with inflowing fluid the different forces due to pressure acting on the opposing piston faces slidably displace the said piston to uncover the valve outlet, thereby permitting fluid flow, when the said orifice is open, and to cover the outlet when the said orifice is closed or substantially closed, so as to interrupt the fluid flow, in such manner that inflowing fluid pressure above a predetermined level can be vented by momentary piston displacement to uncover the valve outlet.

In a preferred embodiment of the invention the piston is formed in two parts held apart by a spring which normally keeps the said two parts in fixed relationship to one another, but which, with inflowing fluid pressure above a pre-determined level and a closed or substantially closed orifice, is momentarily compressed thereby uncovering the outlet to vent the fluid therethrough and relieve the excess pressure.

Inasmuch as the valve of the present invention may be required to function in a fluid which may contain unfiltered foreign matter, rigid, i. e. metal-to-metal, closure surfaces may give rise to leakage of fluid after shut-off due to fouling of the valve seat by such foreign matter and thereby preventing complete shut-off where this is required. To obviate this, the piston may be provided with a diaphragm having a resilient periphery adapted to co-operate with a chamfer provided on the valve casing to form a leak-proof seal, immediately prior to the piston covering the valve outlet.

When passing fluid into a tank or the like at high flow speeds, the direction of a single jet of fluid into the tank may cause distortion of the tank and subsequent leakage. To avoid this, the outlet of the valve of the present invention preferably consists of a plurality of ports or openings which provide discharge of fluid by a plurality of radially dispersed jets. Dispersal of the outlet is preferably so arranged that excessive spraying of the fluid does not occur, as this may give rise to evaporation of the fluid, or, in the case of fuel, atomization thereof with its attendant fire risk.

The closable orifice of the cavity of the valve may be controlled by manually, electrically, pneumatically, hydraulically or float-operated means. An example of float-operated means in accordance with the invention, for use in tanks and the like reservoirs, consists of a resilient buffer, carried on an arm pivoted at one end to the valve casing, arranged to close the cavity orifice when a float, also carried on the said arm, is lifted to a predetermined level by the fluid in the tank. If desired the resilient buffer may be replaced by a rigid valve seat mounted on a ball-and-socket joint.

If it is desired that the outlet remain closed in normal use after the fluid inflow to the valve has been stopped, a spring may be provided to maintain the piston in the closed position. This spring need only be a light one in comparison with the fluid pressure acting on the piston, so that said spring will collapse when inflow of fluid to the valve commences. This spring also assists in the closing action of the piston at very low fluid pressures. Moreover, to obtain a completely leak-proof seal it may be advantageous to provide the passage through the piston with a non-return valve.

Where it is desired to use the valve for off-loading, means may be provided manually to depress the piston and thus allow fluid to be sucked off in a reverse direction through the outlet and inlet of the valve.

Where it is desirable to use the valve not only as a filling valve for fluid tanks or the like especially aircraft fuel tanks, but also for emptying the contents of said tanks by gravity, manually, electrically, pneumatically or hydraulically operated means are provided in the head of the valve, to displace the piston and uncover the valve outlet so as to allow fluid to pass by gravity in a reverse direction through the valve openings when the valve is fitted to the base of a tank or the like.

In order that the invention may be more clearly understood, reference is made to the accompanying drawings which illustrate diagrammatically and by way of example several embodiments of the invention, and in which:

Figures 1 to 3 are sectional elevations of one embodiment of valve according to the invention, suitable for use in fuel tanks, for example, of aircraft and the like, showing it in the "open," "closed" and "relieving" positions, respectively;

Figure 2:
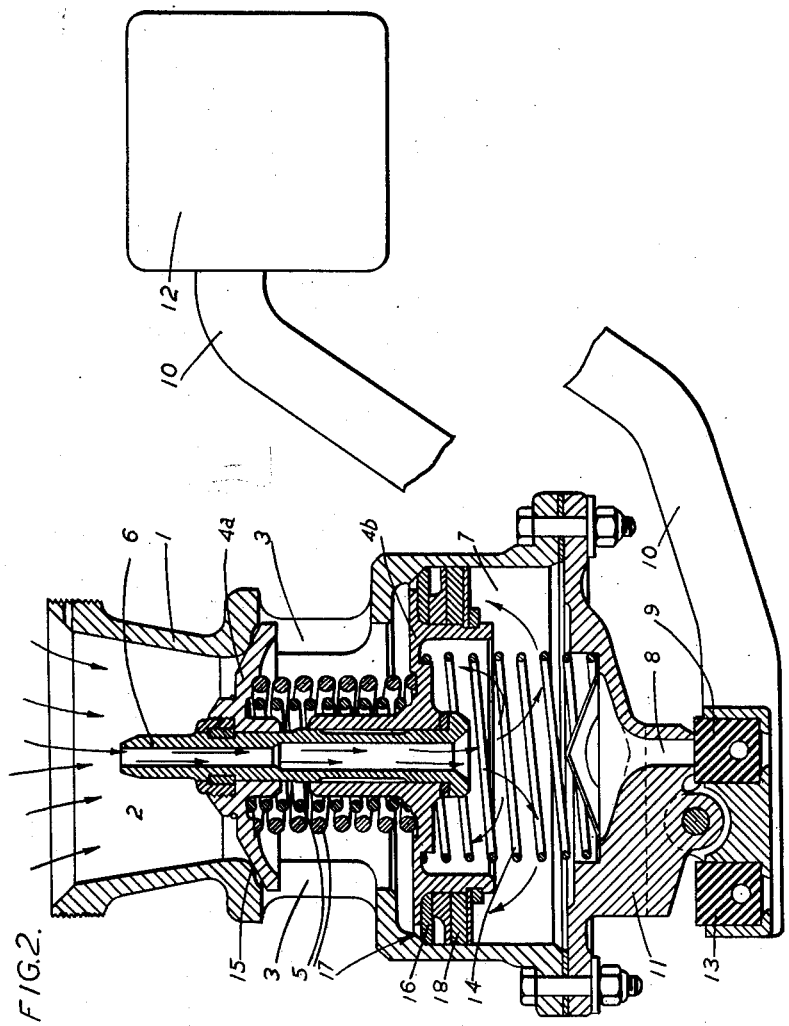
Figure 3:
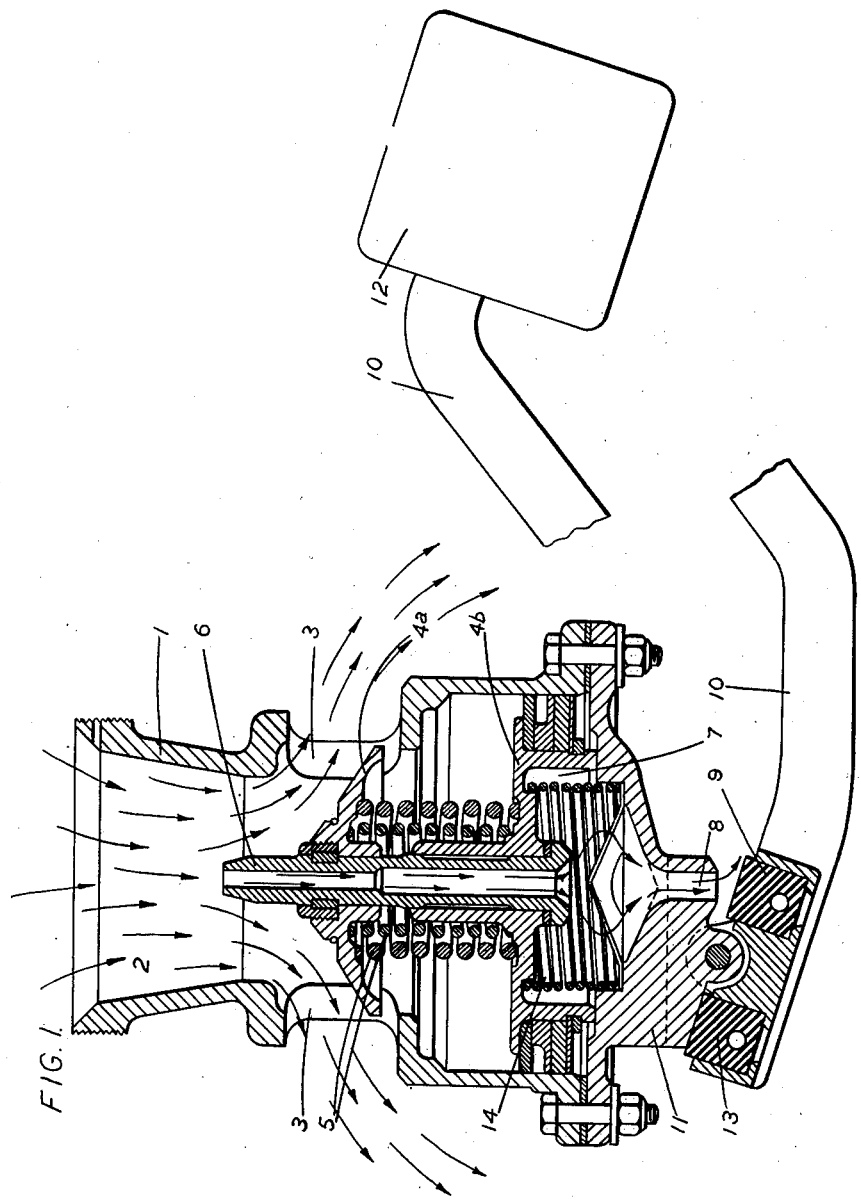

Referring to Figures 1 to 3, a valve casing 1, with an inlet 2 and outlet 3, has a piston slidably arranged therein. Said piston is formed in two parts, 4a and 4b, normally held apart in fixed relationship to one another by springs 5. The two part piston 4a, 4b, is stepped, that is the lower part 4b is of larger diameter than part 4a, the casing 1 being shaped accordingly. The lower part of the piston thus presents a greater area to the fluid pressure in the cavity 7 when the orifice 8 is closed, than the part 4a presents to the inlet pressure. A passage, formed by a tube 6 fixed in the upper piston part 4a and slidable in part 4b, is provided through the piston to allow fluid to enter a cavity 7 in the casing 1. Cavity 7 has an orifice 8 which may be closed by any suitable means, such as by the buffer, 9.

With the valve in the position shown in Figure 1, fluid enters under pressure at 2 causing the piston 4a, 4b to move downwards to uncover the outlet 3, the closeable orifice 8 being open. Fluid thus flows through the valve through the outlet 3 and also through the passage 6, cavity 7 and orifice 8. If now the orifice 8 is closed or substantially closed, see Figure 2, the pressure of the fluid entering cavity 7 will rise until the force acting on the underside of piston 4b exceeds that acting on the top of the piston 4a thereby lifting the piston until it cuts off the flow through the outlet 3. If a complete shut-off is not required the travel of the piston may be suitably arrested by fixed or controllable means (not shown).

By suitably dimensioning the valve components, the force due to the pressure in the cavity 7 can, if desired, be caused to increase sufficiently to move the piston and close the outlet 3 before the orifice 8 is quite closed. Fluid therefore continues to flow through the valve at a very slow rate via the passage 6, cavity 7 and orifice 8 until the buffer 9 finally closes the orifice. This arrangement is particularly useful where it is desired to reduce the rate of filling to a tank or the like when it is nearly full so minimizing the possibility of excesssive pressures being generated therein. Fuel tanks, for example, of aircraft, are normally fitted with a vent but such vents may not be large enough to relieve the pressure built up in the tank when filling at high flow speeds, more particularly when the tank is nearly full. By substantially reducing the rate of filling, for example from 100 gallons per minute to 5 gallons per minute, during the last part of the filling operation, the vent is able to relieve any pressure generated.

As previously stated, when passing fluids at high flow speeds, an immediate complete shut-off is liable to cause high surge or "flick" pressure loads with consequent danger of "hammering" in the pipe lines of the fluid system. In the valve of the present invention, any pressure above the piston part 4a at shut-off which is higher than that to which spring 5 is set, is relieved automatically by depression of the part 4a, compression of spring 5 and the momentary escape of fluid through the outlet 3. This condition is illustrated in Figure 3. As soon as the pressure of the fluid has dropped, spring 5 re-asserts itself to lift the piston part 4a and cover the outlet 3.

As previously stated the orifice 8 can be closed by any suitable manual, electrical, pneumatic, hydraulic or float-operated means. In the example of Figures 1 to 3, however, float operated means are shown. These consist of a resilient buffer 9 carried on an arm 10 pivoted in a bracket 11 secured to the bottom of the valve casing. A float 12 is attached to the other end of the arm 10. When the level of the fluid in the tank or the like to which the valve is fitted rises to a predetermined level, the float lifts the arm until the buffer 9 closes or substantially closes the orifice 8 thus causing the pressure in the cavity 7 to rise as hereinbefore explained and cut off the supply of fluid to the tank. A second buffer 13 may be fitted to the arm to act as a stop to prevent undue movement of the arm 10.

If it is desired to maintain the valve closed after the fluid supply has been stopped, a spring 14 is provided between the bottom of the casing 1 and the underside of the piston part 4b. This spring may be a light one in comparison with the fluid pressure acting on the piston. This spring also assists in the closing action of the piston at very low fluid pressures.

Figure 2 shows the device hereinbefore mentioned for ensuring a leakproof seal when the valve is used for handling fluids which may contain unfiltered foreign matter. The only rigid, i. e. metal-to-metal, closure surface between the piston and the casing is provided by a shoulder of the piston part 4a registering with the annular seating 1 on the casing 1. The piston part 4b carries a resilient diaphragm 16 which is so arranged that just prior to the piston seating at 15 the diaphragm contacts a chamfer 17 provided on the casing 1 and is deflected to form a leakproof seal between the diaphragm and chamfer, thereby permitting a leakproof seating of part 4a. The piston part 4b is also provided with a felt or similar scraper ring 18 below the diaphragm 16, which prevents any foreign matter in the fluid from fouling the diaphragm.

Figure 4:
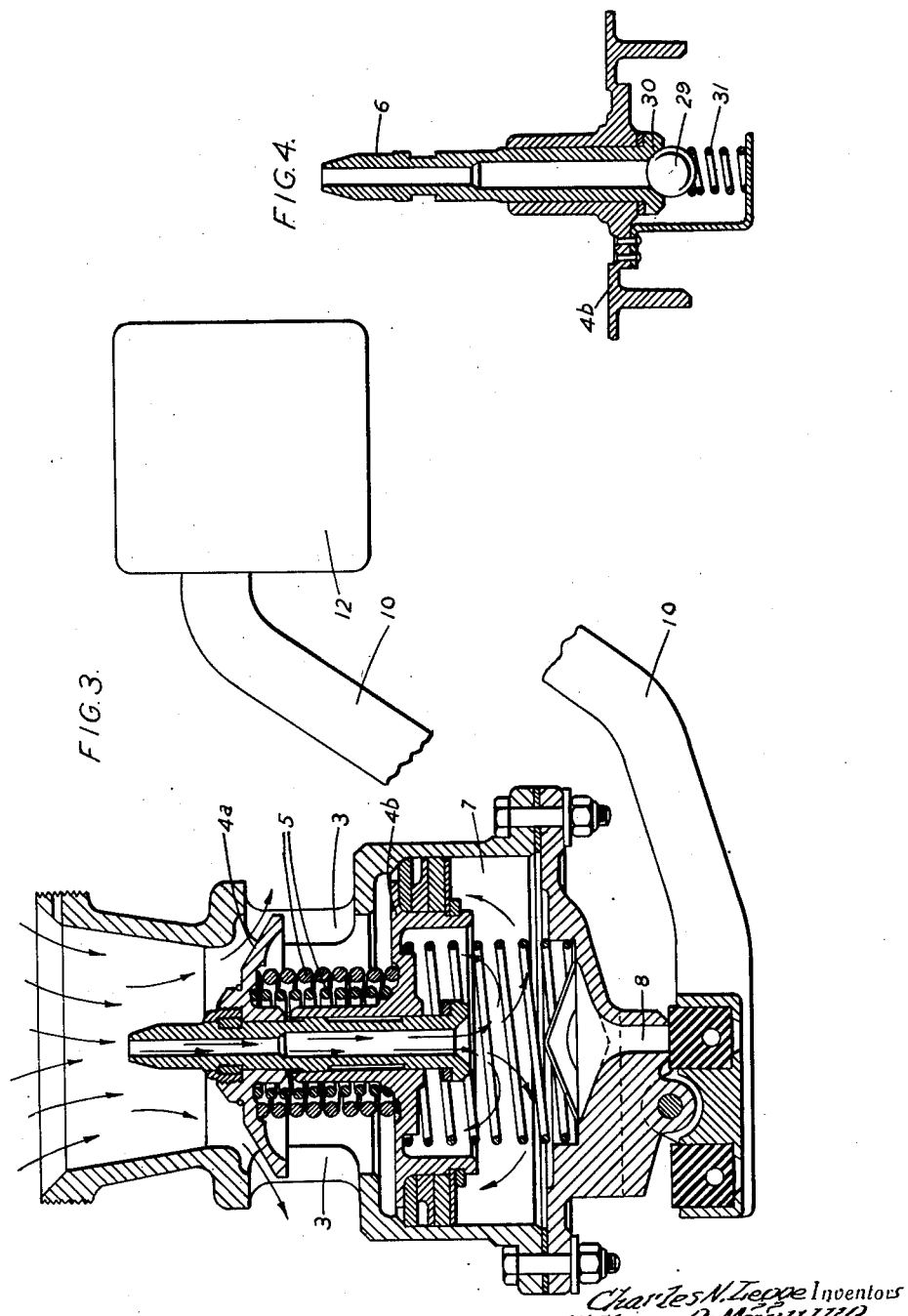
Figures 4 and 5 are details of further features of the invention.

The embodiment illustrated in Figures 1 to 3 is suitable for use where the venting effect of the passage 6 is immaterial or even a desirable feature of the device. Where, however, a complete seal is required, a non-return valve is incorporated in the passage. Figure 4 shows an example of such valve consisting of a ball 29 held against a seating 30 provided at the bottom of the passage 6, by a spring 31, secured in any suitable manner to the passage or piston. The seating 30 is preferably provided with a lining of cork, rubber or other suitable resilient material.

Figure 5:
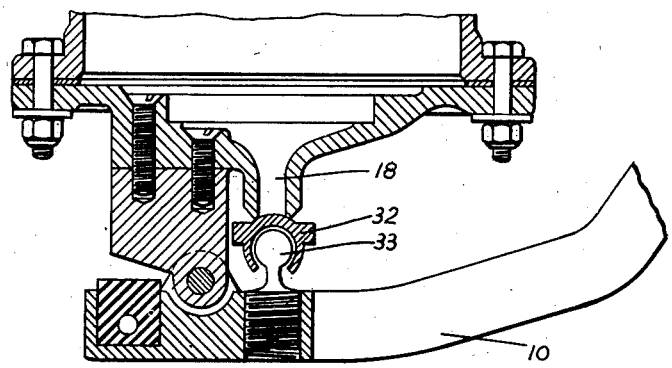

A modified form of closure for the orifice 8 is shown in Figure 5 which consists of a metallic valve seat 32 mounted on a spindle 33 to form a ball-and-socket joint. The valve seat is therefore self-aligning. The spindle 33 has a screw thread for attachment to the float arm 10, so that the spindle and its seating can readily be adjusted thus ensuring efficient sealing of the orifice 8.

Figure 6:
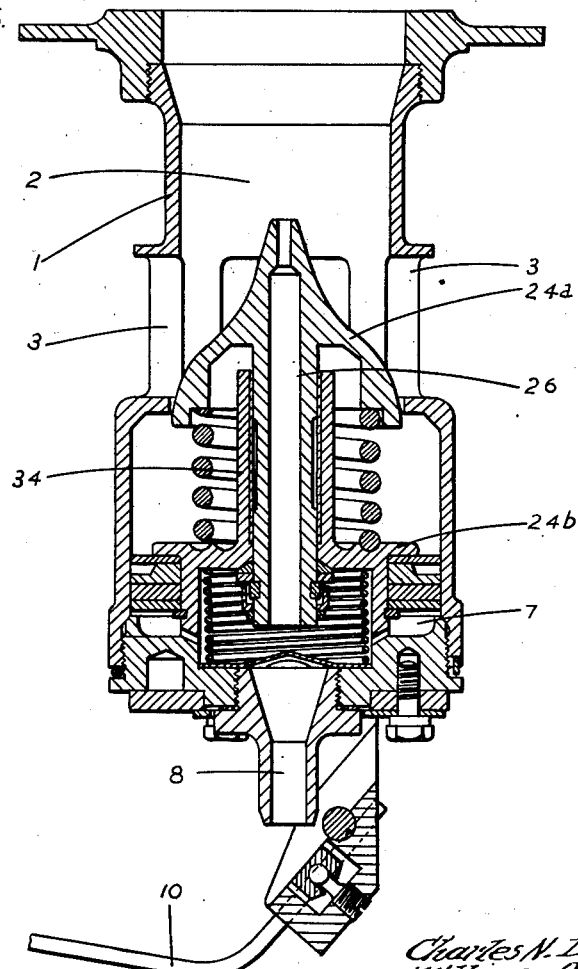
Figure 6 is a sectional elevation of another embodiment of valve.

In the embodiment of valve illustrated in Figure 6, the upper part of the piston 24a is of streamlined shape to facilitate fluid flow therethrough, and has an integral tube containing a passage 26 therethrough. The tube slides within a tubular extension 34 formed on the lower piston part 24b. In other respects this embodiment is similar to and operates identically with that of Figures 1 to 3. In this illustration the valve is shown in its "open" position.

It will be understood that the invention is not limited to the embodiments illustrated in the drawings, but includes modifications thereof within the scope of the appended claims.

We claim:
1. A fluid control valve comprising a casing, fluid inlet and outlet orifices in said casing, a cavity in said casing, a vent leading from said cavity, means for opening and closing said vent, a closure unit including a valve member cooperative with said inlet, a piston member movable in said cavity, spring means between said valve member and piston member and biasing them apart but subject to compression by inlet pressure on said valve member to permit unseating of said valve member, a piston member having an aperture therethrough, a tubular stem on said valve member and slidably extending through said piston operative for communication with said cavity to connect it with the inlet side of said casing to subject said piston member to fluid pressure when the cavity vent is closed and move it toward said valve member in opposition to said spring means and thereby urge said valve member toward closed position, said piston member having a larger diameter than said valve member to present a greater area to fluid pressure, and means on said stem for limiting relative movement of said members by said spring means so that said valve member is retained in open position when said piston member is retracted in said cavity.

2. A fluid control valve comprising a casing, fluid inlet and outlet orifices in said casing, a cavity in said casing, a vent leading from said cavity, means for opening and closing said vent, a closure unit including a valve member cooperative with said inlet, a piston member movable in said cavity, spring means between said valve member and piston member and biasing them apart but subject to compression by inlet pressure on said valve member to permit unseating of said valve member, means connecting said cavity with the inlet side of said casing to subject said piston member to fluid pressure when the cavity vent is closed and move it toward said valve member in opposition to said spring means and thereby urge said valve member toward closed position, said piston member having a larger diameter than said valve member to present a greater area to fluid pressure, and means connecting said valve member and piston member to limit the relative movement thereof by said spring means, and including a stem on said valve member, a sleeve aperture on said piston member and through which the stem passes, and a head on said stem remote from said valve member for abutment with the adjacent end of the sleeve under the influence of said spring means.

3. A fluid control valve comprising a casing, fluid inlet and outlet orifices in said casing, a cavity in said casing, a vent leading from said cavity, means for opening and closing said vent, a closure unit including a valve member cooperative with said inlet, a piston member movable in said cavity, spring means between said valve member and piston member and biasing them apart but subject to compression by inlet pressure on said valve member to permit unseating of said valve member, means connecting said cavity with the inlet side of said casing to subject said piston member to fluid pressure when the cavity vent is closed and move it toward said valve member in opposition to said spring means and thereby urge said valve member toward closed position, a flexible ring carried by said piston member, a chamfer in said casing for engagement by said ring as the piston member approaches valve closing position, and means connecting said valve member and piston member to limit the relative movement thereof by said spring means so that said valve member is retained in open position when said piston member is retracted in said cavity.

CHARLES NORTON LEGGE.
WILLIAM OKE MANNING.

REFERENCES CITED

The following references are of record in the file of this patent:

UNITED STATES PATENTS

| Number | Name | Date |
| --- | --- | --- |
| 299,888 | White | June 3, 1884 |
| 457,005 | McNeil | Aug. 4, 1891 |
| 654,522 | Cowey | July 24, 1900 |
| 763,063 | Mansfield | June 21, 1904 |
| 797,353 | Goodfellow | Aug. 15, 1905 |
| 1,025,341 | Turner | May 7, 1912 |
| 1,623,431 | McVoy | Apr. 5, 1927 |
| 2,002,451 | Gray | May 21, 1935 |
| 2,064,343 | Finley | Dec. 15, 1936 |
| 2,351,873 | Parker | June 20, 1944 |